Nov. 16, 1926.  
C. G. SMITH  
1,607,369  
MACHINE FOR SPLITTING, CLEAVING, OR OTHER WORKING OF STONES AND THE LIKE  
Filed Jan. 19, 1923  5 Sheets-Sheet 1

Nov. 16, 1926.  1,607,369
C. G. SMITH
MACHINE FOR SPLITTING, CLEAVING, OR OTHER WORKING OF STONES AND THE LIKE
Filed Jan. 19, 1923   5 Sheets-Sheet 3

INVENTOR
C. S. Smith
BY Wm Wallace White
ATTORNEY

Nov. 16, 1926.  
C. G. SMITH  
1,607,369  
MACHINE FOR SPLITTING, CLEAVING, OR OTHER WORKING OF STONES AND THE LIKE  
Filed Jan. 19, 1923  5 Sheets-Sheet 4
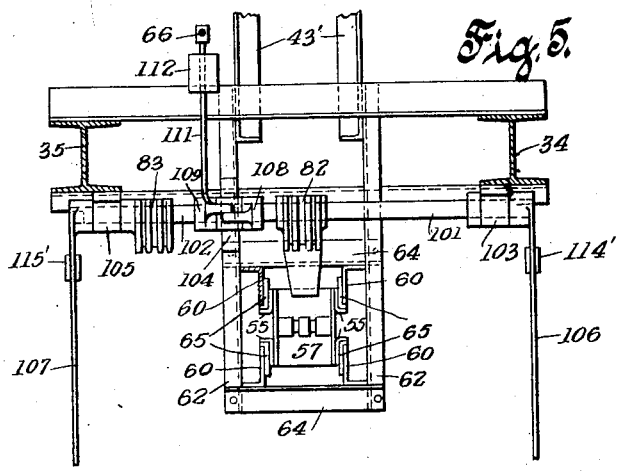
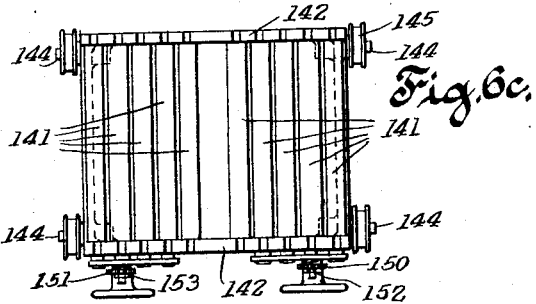
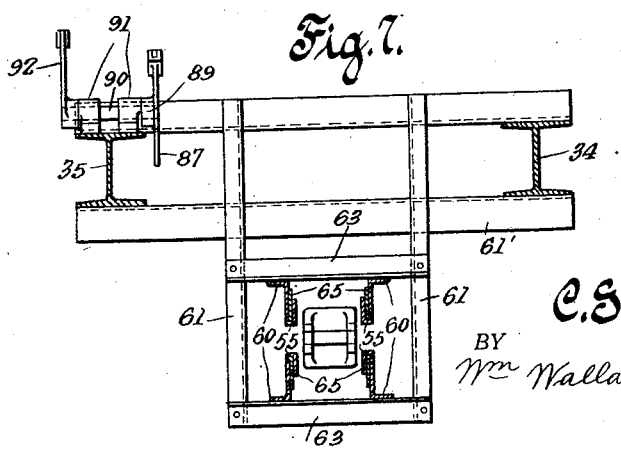
INVENTOR  
C. G. Smith  
BY  
Wm Wallace White  
ATTORNEY Nov. 16, 1926. 1,607,369
C. G. SMITH
MACHINE FOR SPLITTING, CLEAVING, OR OTHER WORKING OF STONES AND THE LIKE
Filed Jan. 19, 1923 5 Sheets-Sheet 5

INVENTOR:
CARL G SMITH
BY: Francis E Boyer
ATTORNEY.

Patented Nov. 16, 1926.

1,607,369

UNITED STATES PATENT OFFICE.

CARL GUSTAF SMITH, OF STOCKHOLM, SWEDEN.

MACHINE FOR SPLITTING, CLEAVING, OR OTHER WORKING OF STONES AND THE LIKE.

Application filed January 19, 1923, Serial No. 613,589, and in Sweden February 6, 1922.

This invention relates to a machine for the splitting, cleaving or other working of stones, chiefly for manufacturing pieces of a certain size for paving-blocks or the like, the object of the invention being to provide a machine of this character which is simple in construction and very efficient and reliable in operation.

In machines of this kind, a b'ock of stone is generally split in certain natural cleaving directions, in such a way that pillars are thereby produced, said pillars being easily afterwards divided into smaller pieces also by the machine. To this end a small groove is formed on one side of the stone, this operation being called "the grooving operation", whereafter by one or more blows the stone is snapped off, this operation being cal'ed the "splitting operation". On account of the necessity of making the first grooves in the block of a considerable length, the groove must be produced by several blows continually, which necessitates a moving of the block in a straight line between the blows.

With this and other objects in view, a characteristic feature of the invention consists in the manner in which the block of stone is manipulated in order to attain the right centered position between the blows, and further, in the way in which the hammer operating mechanism cooperates with the block operating mechanism, means being provided for rendering all mechanisms safe and reliable and to render the work as little fatiguing as possible. Other objects and advantages of the invention will appear in the following description.

Figure 1:
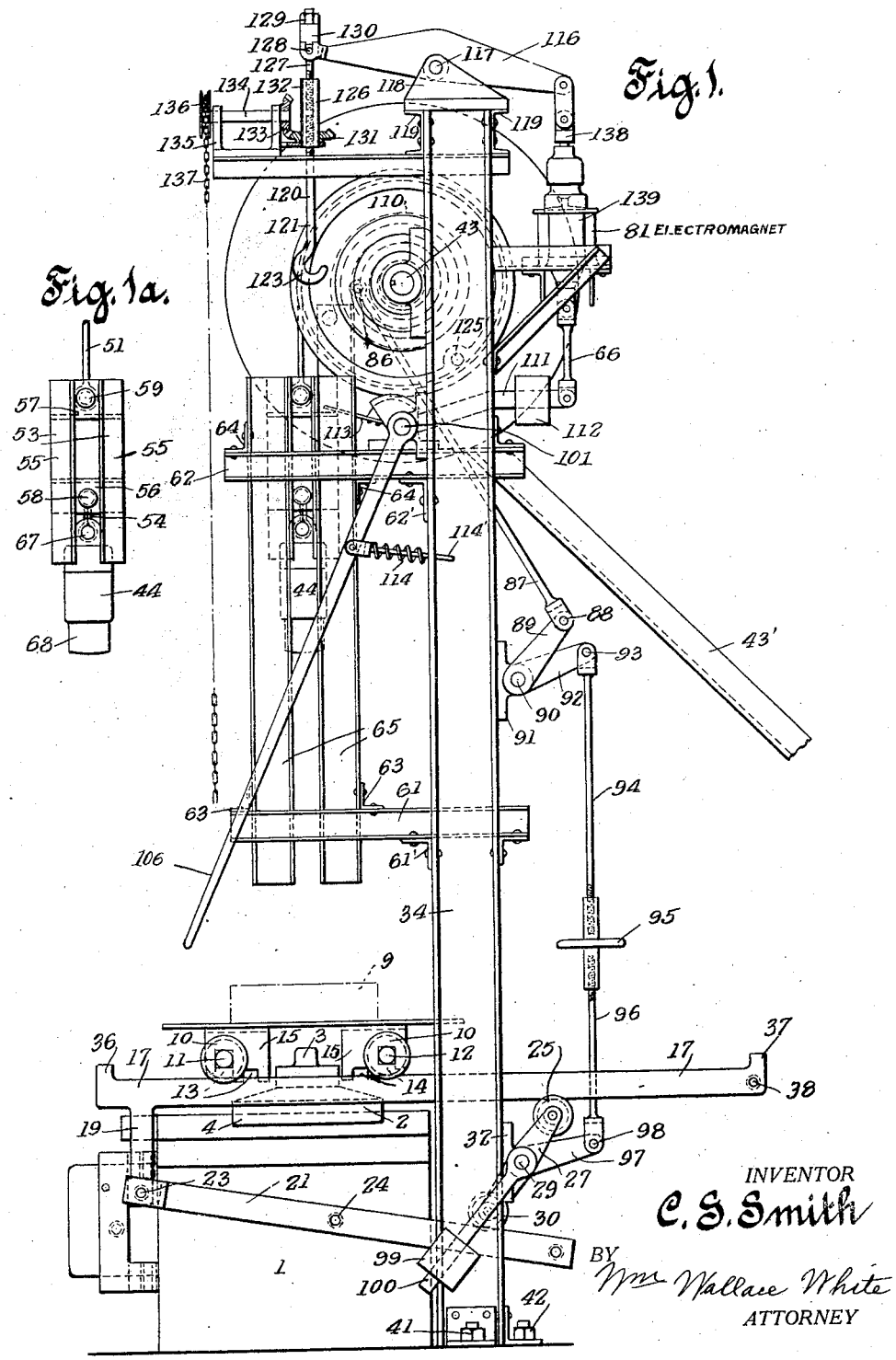
Figure 2:
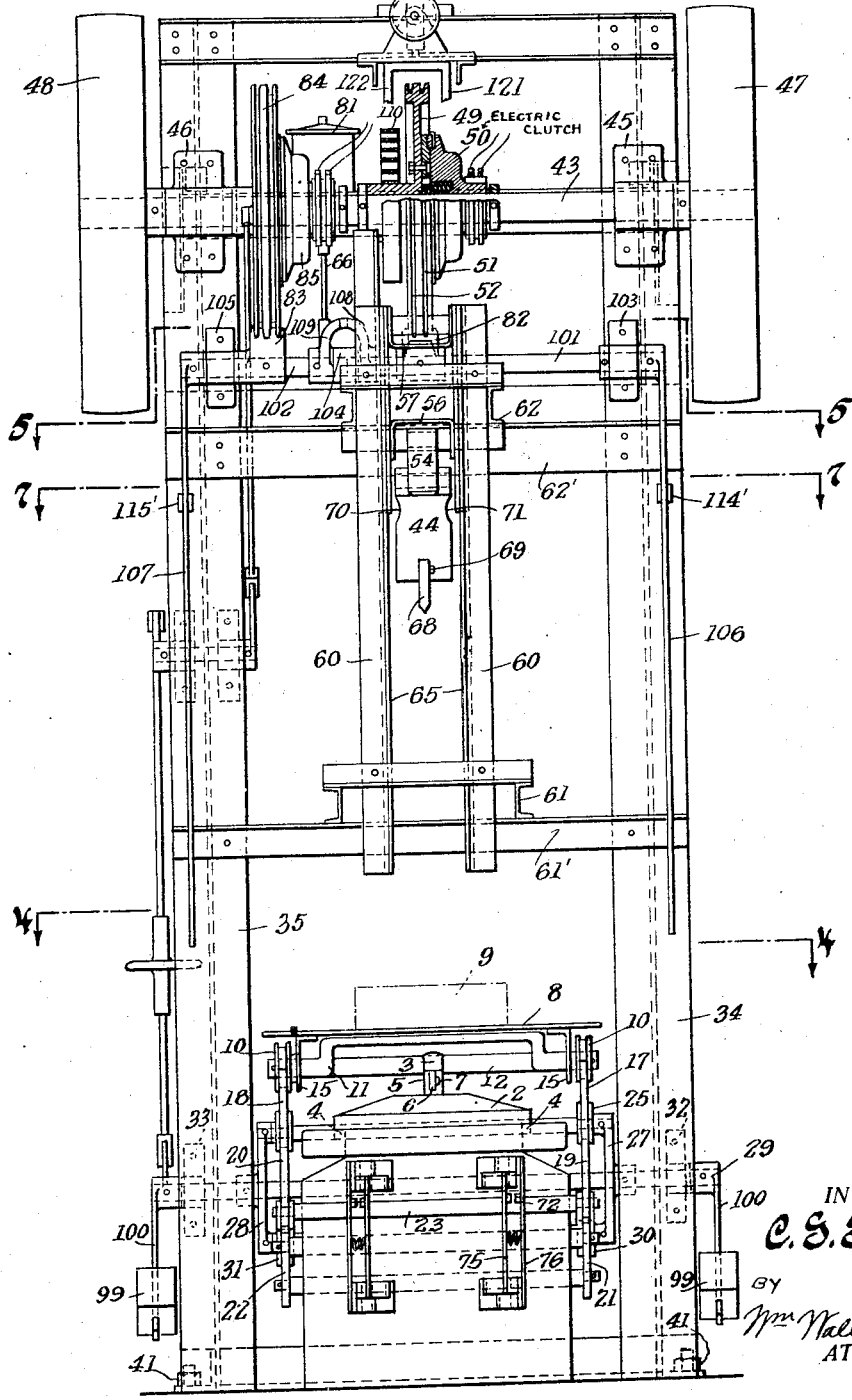
Figure 3:
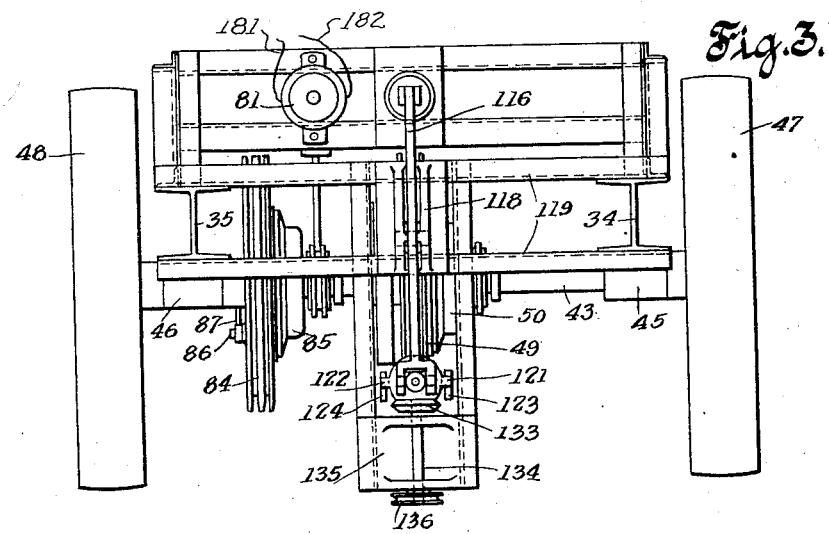
Figure 4:
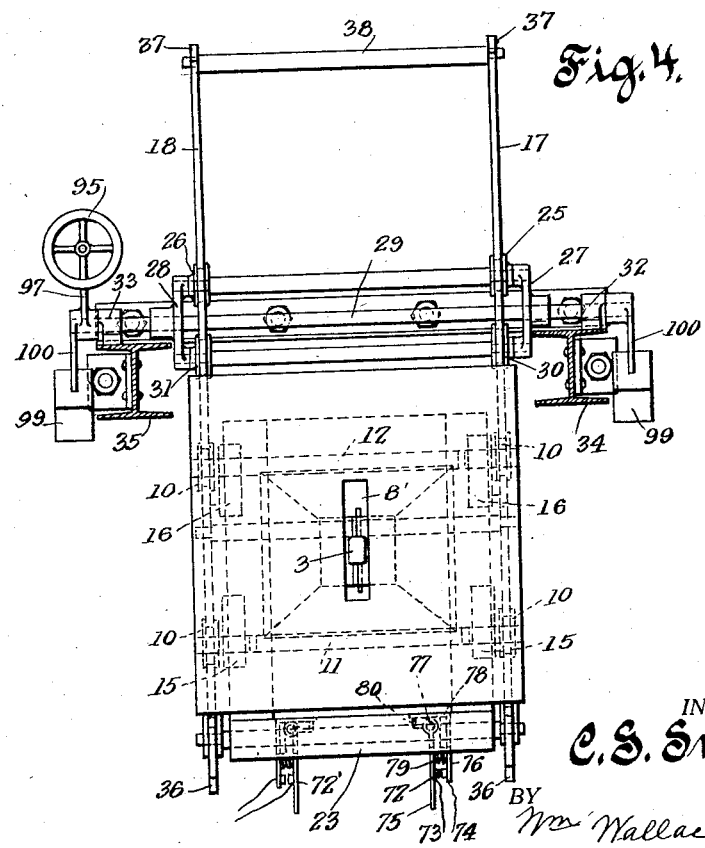
Figure 9:
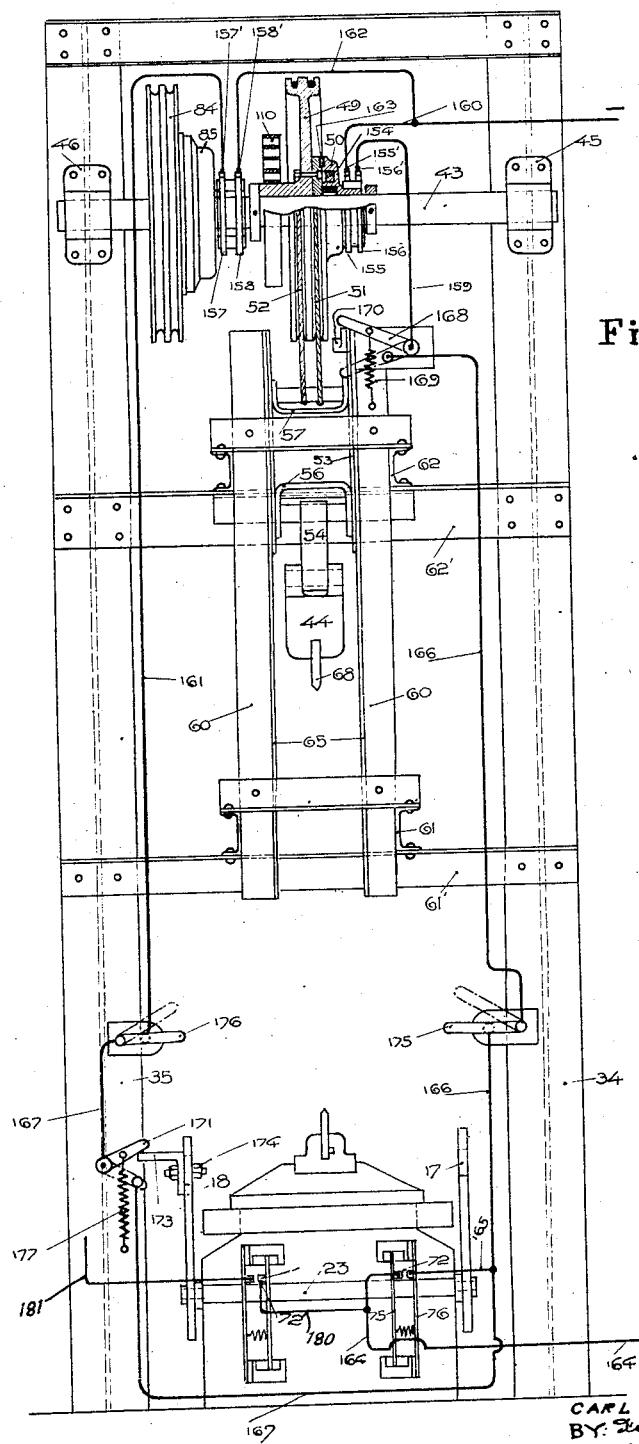

In the accompanying drawings Figure 1 is a side elevation of the machine, partly in section, Fig. 2 a front elevation, Fig. 3 a plan view, Fig. 4 is a horizontal section on the line IV—IV (Fig. 2), Fig. 5 a horizontal section on the line V—V (Fig. 2). Fig. 6A is a modified form of a part of the machine, shown in front elevation, Figures 6B and 6C show this form in side elevation and plan view respectively. Fig. 7 is a section on the line VII—VII (Fig. 2). Figs. 1A and 8 show details. Fig. 9 is a front elevation, partly in section, illustrating the electrical connections, some of the parts being omitted for the sake of clearness.

The machine is provided with a base 1 preferably of granite or concrete, made up in one piece or composed of two or more pieces connected to each other in any suitable manner. The base may also be cast in one piece with the foundation of the machine. On the upper side of the base 1 there is mounted a plate 2 of suitable metal, upon which plate a steel anvil 3 is fixed, this steel anvil being arranged to form a rest for the stone block and adapted to transmit to the base the pressure applied to the block during the working operations, particular'y the splitting operation. The plate is provided with two flanges 4 gripping over the sides of the base so as to secure a steady position. The steel anvil 3 is fixed to an elevated part of the plate by means of a tongue 6 fitted into a groove 5 in the plate and secured by means of a wedge 7. The upper side of the anvil 3 shows a convex surface, but may in certain cases preferably be provided with an edge.

Above the base 1 there is arranged a carrier plate 8 for the blocks of stone to be treated, one block being shown at 9 in Figs. 1 and 2, drawn with dot and dash lines. This carrier plate forms the upper part of a carriage, fitted with running wheels 10 mounted on shafts 11, 12, the shaft 11 being bent upwards for a part of its length, in order to enable the carriage to be moved some distance to the right (Fig. 1) without coming into contact with the steel anvil. On the underside of the carrier p'ate 8 adjacent to each of its side edges there are secured by means of rivets, screws or in any other suitable manner a pair of brackets or plates 15, provided with recesses 13, 14 for the shafts 11, 12. These recesses, according to Fig. 1 are arranged in such a manner, that by placing the shafts into different recesses, the height of the carrier plate above the wheels may be varied for adjustment.

In the carrier plate 8 there is arranged an opening 8', immediately above the steel anvil 3 (Fig. 4), this opening being of such a length, that it will be in position above the steel anvil although the carriage moves a certain distance along its track. This track, consists of rails 17, 18, which are connected at one end to the free ends of levers 21, 22 (Figs. 1 and 2) by means of arms 19, 20 and a shaft 23. At the other end the rai's are supported by rollers 25, 26, journaled in double-armed levers 27, 28, the other ends of which are provided with similar rollers 30, 31. The levers 21, 22 at each side of the bed 1 are journaled on shaft 24 and the levers 27, 28 are fixed on the shaft 29. The shaft 29 is supported by bearings 32, 33, fixed on the columns 34, 35. The above mentioned rollers 30, 31 engage the top edges of the levers 21, 22 (Figs. 1 and 2). By turning the shaft 29 the rails with the carriage may be raised or lowered. Stops 36, 37 for the carriage are provided at each end of the rails. The rails are lengthened on the right side (Fig. 1) to provide a loading platform for the carriage. On this side the rails are connected to each other by means of a rod 38.

The upper part of the machine is supported by the columns 34, 35 mentioned above. These columns, forming the main part of the frame or stand of the machine, are secured to the foundation by means of bolts 41, 42 and staid up by means of two stays 43′, one for each column. The columns are tied to each other by means of a system of angle-irons. The upper parts of the columns carry main bearings 45, 46 for the main driving shaft 43, to which shaft driving motion is imparted by means of a belt pulley 47. The shaft 43 is provided with means for operating the drop hammer 44 and for lifting and lowering the rails 17, 18. At the left end of shaft 43 (Fig. 2) there is shown another belt pulley 48, consideration being taken of the eventuality of high load on the machine, this necessitating the use of two driving belts. In this case consideration is also taken of the great variations of the load, both belt pulleys being designed to act also as fly wheels.

The hammer 44 is of the drop type, being hoisted up to a certain position by means of a wire or a rope arrangement, in this case consisting of two ropes 51, 52, fixed on a grooved sheave 49, there being one peripheral groove for each of the wire ropes. The ropes are secured to the periphery of the sheave. The hammer having attained its top position, the sheave is disconnected from the shaft in order to allow the hammer to drop down on the stone block. With this purpose in view, the sheave 49 is connected to the shaft 43 by means of an electro-magnetic coupling hereinafter described, connection being made between the sheave and the shaft, when an electric current is induced through the coupling. The rotation of the sheave causes the ropes to be wound up and the hammer to be raised at an equal and even speed. The rope ends are attached to a guide block 53, this block being connected to the hammer 44 by means of flexible links 54 of leather or the like and bolts 58, 67.

The guide block 53 may be made up in one solid piece, or designed as shown in Fig. 1ᴬ. Four vertical angle plates or angle irons 55 (see also Figs. 2, 5 and 7) are secured together by means of a pair of plates 56, 57, the plates being flanged according to Fig. 2 and with the flanges welded on to the angle irons 55. The upper plate 57 carries the connecting bolts 59 for the ropes 51, 52 and the lower plate 56 carries the bolts 58 for the hammer supporting links 54, all bolts being welded on to the vertical flanges of the plates. On the angle irons 55 the guide surfaces are arranged. The vertical guides 60 are secured in position and connected to the columns 34, 35 by means of angle bars 61, 61¹, 62, 62¹. These bars are riveted to the columns. Angle irons 63, 64 secure the guides 60 to the bars 61, 62. The guides are provided with plates 65 to take up the wear.

The hammer consists of a solid block 44 of iron or steel, the upper part of which is provided with a bolt 67 for the lengths 54 the lower part being provided with a steel anvil 68 fixed in a groove in the block by means of a wedge 69. The steel anvil 68 is sharpened into an edge, as shown in Figs. 1ᴬ and 2, but may in certain cases be convex or rounded, the steel anvil 3 in such cases carrying a sharpened edge. At each side of the block 44 there is a recess 70, 71 respectively (Fig. 2), with the object of allowing the hammer to swing slightly to the side without coming into contact with the bottom edge of the guide block 53. The guide block at the same time serves as a stopper for limiting the size of the swinging movement.

The coupling comprises a coupling member 50 secured to the shaft for rotation therewith and having a slight axial movement toward the sheave 49. Disposed within a recess in the coupling member 50, but insulated therefrom, is a magnet coil 154, the terminals of which are each in electrical connection with one of two rings 155, 156, in contact with which are a pair of brushes 155′, 156′, the brush 155′ being connected by a conductor 160 with one pole of a suitable source of energy. When an electric current passes through the conductors in the manner hereinafter described, the magnet coil is energized and thereby strongly attracts the coupling member 50 into frictional engagement with the sheave 49, whereby the latter is locked for rotation with the shaft 43. The coupling member 50 carries on its sheave-engaging face a friction ring 163 which serves to increase the frictional engagement between the members 49 and 50.

For sending a current through the magnet 154 thereby to operate the coupling, I have provided a manually operable switch 72 (Fig. 2) disposed at the base of the apparatus. This switch comprises a pair of elements 75, 76, the member 75 being connected by a wire 164 with the other pole of the source of current to which the conductor 160 is connected, while the switch member 76 is connected by wires 165, 166 and 159 to the brush 156'. The element 75 is designed as a lever, and the element 76 is provided with a plate or flange, secured to the base, the whole being arranged in such a position that the operator may readily close the circuit by exerting a slight pressure on the lever 75 with one of his knees. As shown in Fig. 4, the lever 75 is pivoted on a pin 77, arranged in a lug on the flange of the element, and is normally prevented from closing the contact by means of a spring 79 arranged between the conducting elements 75 and 76. The movement of the lever 75 out from the plate 76 is limited by a stop 80 forming an arm made in one piece with or secured to the lever and bent at an angle for closing up against the flange of the contact element 76.

By this construction it will be seen that when the switch 72 is closed, current will pass through conductor 164, switch 72, conductor 165, 166, 159, brush 156', magnet coil 154, brush 155', conductor 160, back to the source.

The mechanism for raising the rails comprises a sheave 84, Fig. 2, mounted for rotation on the shaft 43, an electromagnetic coupling member 85 secured on the shaft for rotation therewith being provided for locking the sheave 84 to the shaft, and which coupling member is constructed and operates in identically the same manner as the coupling member 50. The coupling member 85 includes a magnetic coil, the opposite ends of which are electrically connected (Fig. 9) respectively with rings 157, 158, in contact with which are a pair of brushes 157', 158', the brush 157' being connected by a conductor 161, 167 with the switch 72, while the brush 158' is connected by wire 162 and conductor 160 with the source of energy. It will thus be seen that when the switch 72 is closed, a portion of the current will pass through the coils of both coupling members 50 and 85, thus causing rotation of both sheaves 49 and 84. The sheave 84 is provided with a pin 86, connected to one end of a rod 87, the other end of which is connected to a lever 89 by means of a pin 88. This lever 89 is secured to a shaft 90, journaled in bearings 91. A lever 92 secured to shaft 90 is connected to a lever 97 on shaft 29. A connecting rod 94, 95, 96, the length of which may be varied, is arranged between the levers 92 and 97, pins 93 and 98 forming the connection. It will be readily understood, that a rotation of the sheave 84 will cause the rails 17, 18 to be raised or lowered according to the direction, in which the sheave rotates.

The variation of length of the connecting rod, 94, 95, 96, for facilitating adjustment of the vertical position of the rails is carried out by the following means. The rod is made of two pieces 94 and 96, at the free ends provided with right and left hand threads and screwed into a turnbuckle provided with a hand wheel 95. By turning the socket, the length of the rod 94, 95, 96 may be varied at will.

The connections between rails 17, 18 and sheave 84 are chosen in such a way, that on closing the electric circuit through switch 72', the coupling 85 will be thrown into operation thus forming a fixed connection between shaft 43 and sheave 84. Hereby the rails 17, 18 and the carrier plate 8 will be raised, and when the coupling is released, the parts will return to the lowered position by the influence of their own weight. In order to facilitate the raising operation by lessening the force required, two counterweights 99 are arranged on levers 100 on the shaft 29. Instead of counterweights springs may be used with the same result.

The couplings 50 and 85 are connected in the same circuit, so that when the circuit is closed by means of switch 72, the current will pass through both couplings, causing the hammer and rails to be raised at the same time. The rails having attained a certain position, the current through coupling 85 will be broken automatically and the sheave 84 will cease to rotate although the hammer continues its raising movement as long as contact 72 is closed. At a certain position of the hammer, this being its maximum height, the circuit through coupling 50 will also be broken automatically causing the hammer to stop. For opening the circuit when the hammer and rails have been raised to the proper point, an automatically operated switch is placed in each circuit. For breaking the circuit to the coupling member 85 a pivoted switch 171 (Fig. 9) is inserted in the conductor 167, said switch being normally maintained closed by means of a spring 177. The free end of the pivoted switch member 171 extends into the path of a trip member or bracket 173 adjustably secured by a bolt 174 to the rail 18, so that in the upward movement of said rail the bracket 173 engages the switch 171 and swings it on its pivot into open position, as shown in Fig. 9, whereupon current ceases to flow through the coupling member 85 and the upward movement of the rails ceases. The current, however, still continues to flow through coupling member 50, so that the upward movement of the hammer continues. A similar pivoted switch 168 is provided for breaking the circuit to the coupling member 50, this switch being disposed in the upper part of the apparatus, so that the hammer may be raised to its highest point before the circuit is opened. As shown in Fig. 9, the switch 168 is pivoted in contact with conductor 159 and is adapted when closed to bridge the gap between said conductor and the conductor 166, a spring 169 being provided for normally retaining the switch closed. The guide block 53 from which the hammer is suspended carries a lug or arm 170, in the path of which the free end of the switch lever 168 extends, whereby the switch is opened as the hammer arrives at its highest position. In addition to the automatically operated switches above described, a pair of manually operable switches 175 and 176 may be provided for breaking the circuits to the coupling members when desired.

For holding the sheaves 49 and 84 in position when the rails and the hammer are in raised position and the circuit is broken, the following arrangement is provided. In connection with the peripheral grooves of the sheave 49 there is a pawl 82 and in connection with the grooved sheave 84 there is a pawl 83. The pawl 82 is fixed on a shaft 101 and the pawl 83 on a shaft 102. The shafts 101 and 102 are arranged on the same centre line and journaled in bearings 103, 104 and 105 respectively, the ends of the shafts abutting against each other in a bearing 104. The shafts may be turned by means of hand-levers 106 and 107 respectively.

An arm 108, fixed on the shaft 101 and another arm 109 on shaft 102 are both provided with bent levers, arranged in such a manner, that when shaft 102 is turned for releasing the pawl 83 from the grooves of sheave 84 in order to lower the rails, the bent lever 109 acts upon the arm 108, thus causing shaft 101 to turn, thereby releasing the pawl 82. By these means the hammer may be released shortly after, or at any rate not before the lowering of the rails begins.

It is a matter of great importance, that the dropping movement of the hammer shall be as free from resistance as possible. To this effect, in order to render the descent of the hammer and the necessary turning movement of the sheave 49 entirely independent of each other, it will be necessary to accelerate the movement of the sheave. This is achieved by means of a spiral spring 110, one end of which is attached to the sheave, the other end being attached to a fixed part of the machine. The spring, being placed under tension during the ascent of the hammer, will cause the sheave to turn quickly as soon as the pawl is released. By arranging a clearance between the arms 108 and 109 the arm 109 will act upon the arm 108 at an interval after the beginning of its motion, whereby safety is ensured that the rails will have completed their sinking movement and the block will rest on the steel anvil 3 when the hammer falls. The hammer begins to move down immediately after the lowering of the rails.

In addition to the hand levers 106 and 107 for manually releasing the pawls 82 and 83, electrically operative means is provided for accomplishing the release of said pawls which means comprises an electromagnet 81, arranged to raise one end of a lever 111, fixed on shaft 102 and connected to the magnet by means of a rod 66. The magnet may be of any known construction having an iron core in a solenoid. The lever 111 carries a counterweight 112 for the purpose of forcing the pawl 83 into working contact with the sheave 84 in order to stop the rotation of the same as soon as the circuit of the electromagnet coupling 85 is thrown off. For energizing the magnet 81, I have provided a switch 72' similar in every respect to the switch 72 and disposed in position to be operated by the left knee of the operator. The movable member of switch 72' is connected by a wire 180 and conductor 164 with one pole of the generator or other source of energy, while the fixed member of the switch is connected by a wire 181 with one end of the coil of magnet 81, the opposite end of the coil being connected by a wire 182 with the opposite pole of the generator. It will thus be seen that when the switch 72' is closed current passes to the magnet 81, thus energizing the same and causing operation of the mechanism above described for releasing the pawls 82 and 83 from the sheaves 49 and 84, thereby setting the sheaves free and permitting the hammer and rails to descend by gravity.

The hammer 44 having attained its highest position, the current through the electromagnet coupling 50 is thrown off by means of an automatic circuit breaker, acted upon by the hammer or any other part of the hammer actuating motion. To ensure working contact between the pawl 82 and the sheave 49 in order to prevent the hammer from falling back, the pawl is provided with a spring 113, the free end of which is positioned in the way of the guide-block 53. Springs 114 and 115 act upon the hand levers 106 and 107 in order to hold the pawls against the sheaves. The springs are coiled around guide pins 114¹ and 115¹, pivotally connected to the hand levers and carried through holes in the flanges of the columns 34 and 35.

On a pin 117 in a bearing 118, fixed on a cross beam 119 at the top of the columns (Fig. 1) a balance lever 116 is arranged at one end of which a depending fork 120 is pivoted. The two shanks 121, 122 of this fork are positioned one on each side of sheave 49 and formed into hooks 123, 124. In order to facilitate an adjustment of the vertical position of the fork, the same is built up of two parts, 120 and 127, threaded with right and left hand threads and screwed into a correspondingly threaded nut 126, which is slidably, but not rotatably arranged in a bevel wheel 131 by means of a key 132. The wheel 131 cooperates with another bevel wheel 133 on a shaft 134, journaled in a bearing 135. This shaft 134 carries a sprocket wheel 136 which may be rotated by means of a chain 137, thus turning the nut 126 in order to raise or lower the fork 120. The upper part 127 of the fork is carried through a crosshead 128 and secured by means of a nut 129, separated from the crosshead by a hard rubber washer 130 in order to attain elasticity. The crosshead is provided with pins resting in open bearings in the forked end of the balance lever 116. The sheave 49 is provided with a pin 125, sticking out on both sides of the sheave and arranged to catch the hooks 123 of the fork 120 when the sheave rotates, for which purpose the vertical position of the fork may be adjusted by turning the sprocket wheel 136.

The object of this arrangement is to stop the movement of the sheave after the dropping of the hammer. In order to make the stop elastic, the right end (Fig. 1) of the lever 116 is connected to a hydraulic piston 138 (Figs. 1 and 8), working in a cylinder 139 and forced downwards by a spring 140 in the cylinder. The piston is provided with a system of holes. When the pin 125 catches the forks 123, thus raising the piston 138, the fluid contained in the cylinder 139 will be forced through the holes in the piston, thus acting as an elastic brake for the movement of the sheave.

Figs. 6ᴬ, 6ᴮ and 6ᶜ show a modified form of the carriage. In this form the carrier plate has been replaced by a system of rolls 141, rotatably arranged in a frame 142. The front of this frame is bent upwards at the central portion 143 (Fig. 6ᶜ) so as to allow a free passage when the carriage is passed along over the steel anvil 3. The side parts of the frame are provided with journal pins 144 for the carriage wheels 145 running on the rails 17, 18. The rolls 141, symmetrically arranged in two groups, are connected to each other by means of endless chains 146, 147, cooperating with sprocket wheels on the roll pins. In each of these groups one of the rolls is connected to a hand wheel 148, 149 by means of gears 150, 151, attached to the hand wheel shaft and coacting with gear wheels 152, 153 on the roll pins, the object of this arrangement being to impart movement to the rolls in order to adjust the position of the stone block. The rails 17, 18 may be lowered to such a point that the top of the steel anvil 3 will extend between the rolls to form a rest for the stone block 9 when the hammer drops down.

The details of the machine may be varied as to size, form and arrangement without changing the principle of the invention.

Having now described my invention, what I claim as new and desire to secure by Letters Patent is:

1. A stone splitting machine comprising, in combination, a frame, a shaft mounted for rotation in said frame, a drop hammer releasably suspended from said shaft and adapted to be raised by the rotation of the shaft, an anvil supported below said hammer, a vertically movable stone carrying member disposed above said anvil, means operated by said shaft for raising said member during the raising of the hammer, and means for releasing said stone carrying member and hammer thereby to permit the descent thereof, the organization being such that the stone carried by said member is carried into contact with the anvil in advance of the descent of the hammer.

2. A stone splitting machine comprising, in combination, a frame, a shaft mounted for rotation in said frame, a pair of members mounted for rotation on said shaft, means for locking said members to said shaft for rotation therewith, a drop hammer suspended from one of said members and adapted to be raised thereby, a movable stone carrying member disposed below said hammer, means connecting said stone carrying member with the other of said rotatable members for raising and lowering the stone carrying member, an anvil disposed below said stone carrying member, and means for releasing said locking means thereby to permit the stone carrying member to carry a stone into contact with the anvil and the hammer to descend upon said stone.

3. A stone splitting machine comprising, in combination, a frame, a shaft mounted for rotation in said frame, a drop hammer releasably suspended from said shaft and adapted to be raised by the rotation of the shaft, means for releasing said hammer from said shaft, an anvil disposed below said hammer, a pair of vertically movable stone supporting rails adapted to carry a stone into contact with said anvil, releasable means mounted on said shaft and adapted to be locked thereto for rotation therewith, and means connecting said rails with said releasable means for raising and lowering the rails.

4. A machine for splitting stones comprising, in combination, a frame, a shaft mounted for rotation in said frame, a drop hammer releasably suspended from said shaft and adapted to be raised by the rotation of the shaft, an anvil supported below said hammer, a vertically movable stone carrying member disposed above said anvil, means operated by said shaft for raising said member during the raising of the hammer, means for retaining the hammer and stone carrying member in raised position, and means for releasing said retaining means thereby to permit descent of the stone carrying member and hammer, the organization being such that the stone carried by said member is first placed in position on the anvil and the hammer descends into contact with said stone.

5. A stone splitting machine comprising, in combination, a frame, a shaft mounted for rotation in said frame, hammer-lifting means releasably carried by said shaft for rotation therewith, a drop hammer suspended from said lifting means and adapted to be raised by the rotation of the shaft, an anvil supported below said hammer, a vertically movable stone carrying member disposed above said anvil, a member loosely mounted on said shaft for rotation thereon, releasable means for locking said member to the shaft for rotation therewith, connecting means between said stone carrying member and said loosely mounted member for raising the stone carrying member when the loosely mounted member is rotated in one direction, means for releasing said locking means to permit rotation of said loosely mounted member in the opposite direction independently of the shaft thereby to permit the stone carrying member to descend by gravity, and cushioning means for stopping the rotation of said hammer lifting means.

6. In a stone splitting machine, the combination of a vertically movable drop hammer, an anvil disposed below said hammer, a vertically movable stone-carrying platform above said anvil adapted to carry a stone into contact with the anvil, electrically controlled operating means for simultaneously raising said platform and hammer, and means for releasing said platform and hammer thereby to permit them to drop.

7. In a stone splitting machine, the combination of a vertically movable drop hammer, an anvil disposed below said hammer, a vertically movable stone-carrying platform above said anvil adapted to carry a stone into contact with the anvil, electrically controlled operating means for simultaneously raising said platform and hammer, and means disposed in the path of said platform and hammer for automatically breaking the circuit through the controlling means of the platform and hammer raising means.

8. In a stone splitting machine, the combination of a vertically movable drop hammer, an anvil disposed below said hammer, a vertically movable stone-carrying platform above said anvil adapted to carry a stone into contact with the anvil, electrically controlled operating means for simultaneously raising said platform and hammer, means disposed in the path of said platform and hammer for automatically breaking the circuit through the controlling means of the platform and hammer raising means, and means for retaining at will the hammer and platform in their elevated position.

9. In a stone splitting machine, the combination of a vertically movable drop hammer, an anvil disposed below said hammer, a vertically movable stone-carrying platform above said anvil adapted to carry a stone into contact with the anvil, electrically controlled operating means for simultaneously raising said platform and hammer, means disposed in the path of said platform and hammer for automatically breaking the circuit through the controlling means of the platform and hammer raising means, means for retaining the hammer and platform in their elevated position, and electrically operated means for releasing said hammer and platform thereby to permit them to descend by gravity.

10. In a stone splitting machine, the combination of a vertically movable drop hammer, an anvil disposed below said hammer, a vertically movable stone-carrying platform above said anvil adapted to carry a stone into contact with the anvil, electrically controlled operating means for simultaneously raising said platform and hammer, means disposed in the path of said platform and hammer for automatically breaking the circuit through the controlling means of the platform and hammer raising means, means for retaining the hammer and platform in their elevated position, and electrically operated means for releasing said hammer and platform thereby to permit them to descend by gravity, the organization being such that the platform descends in advance of the hammer.

11. In a stone splitting machine, the combination of a vertically movable drop hammer, an anvil disposed below said hammer, a vertically movable stone-carrying platform above said anvil adapted to carry a stone into contact with the anvil, electrically controlled operating means for simultaneously raising said platform and hammer, means operated by the platform during its ascent for automatically breaking the circuit through the controlling means of the platform raising means, and means in the path of movement of the hammer for automatically breaking the circuit through the controlling means of the hammer raising means.

12. In a stone splitting machine, the combination of a shaft mounted for rotation, a pair of members loosely mounted on said shaft, a drop hammer suspended from one of said members, an anvil disposed below said hammer, a vertically movable platform above said anvil adapted to carry a stone into contact with the anvil, means operated by the other of said loosely mounted members for raising said platform, a pair of electrically operated coupling members secured to said shaft for rotation therewith and axially movable thereon, and manually operable means for closing a circuit through said coupling members thereby to move each of the same into respective engagement with each of said loosely mounted members.

13. In a stone splitting machine, the combination of a shaft mounted for rotation, a pair of members loosely mounted on said shaft, a drop hammer suspended from one of said members, an anvil disposed below said hammer, a vertically movable platform above said anvil adapted to carry a stone into contact with the anvil, means operated by the other of said loosely mounted members for raising said platform, a pair of electrically operated coupling members secured to said shaft for rotation therewith and axially movable thereon, manually operable means for closing a circuit through said coupling members thereby to move each of the same into respective engagement with each of said loosely mounted members. means in the path of movement of said platform and hammer for automatically breaking the circuit through said coupling members, means in engagement with said loosely mounted members for retaining the same against rotation when the circuit is broken, and electrically operated means for releasing said retaining means thereby to permit the platform and hammer to descend by gravity.

In testimony whereof I have signed my name to this specification.

CARL GUSTAF SMITH.